Nov. 5, 1946.　　　　　F. DORCEY　　　　　2,410,639
APRON
Filed Nov. 6, 1944
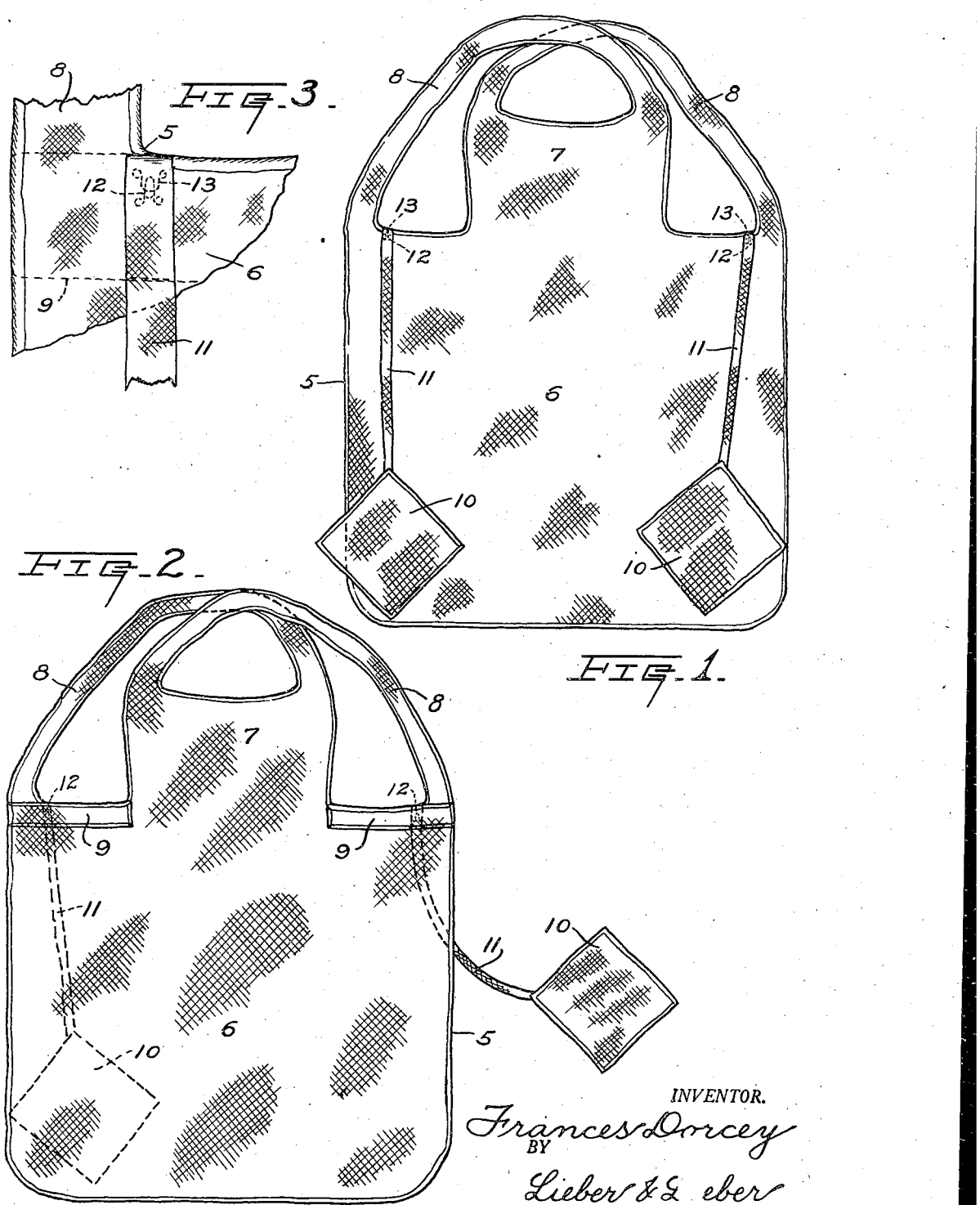
INVENTOR.
Frances Dorcey
BY
Lieber & Lieber
ATTORNEYS.

Patented Nov. 5, 1946

2,410,639

UNITED STATES PATENT OFFICE 2,410,639

APRON

Frances Dorcey, Milwaukee, Wis.

Application November 6, 1944, Serial No. 562,073

2 Claims. (Cl. 2—48)

My invention relates in general to improvements in garments, and relates more specifically to improvements in the construction of aprons especially adapted for household use.

The primary object of the present invention is to provide a new and useful combined apron and hot pad, which is simple in construction and highly effective in use.

It is common practice for housewives and other cooks to wear aprons when performing kitchen duties, and it is also ordinary custom to have available in a kitchen or serving room one or more hot pads for eliminating burns when grasping hot dishes and other heating utensils. These aprons may be of varied design and construction; but the hot pads are usually constructed of fabric in the form of a flat circle, square or other polygon, sufficiently padded so as to guard against rapid transmission of heat therethrough, and usually provided with a hanger or short loop at one corner thereof. The individual hot pads frequently become mislaid or are out of reach and not readily available, when most urgently needed, and severe burns often result. I have discovered, that by associating one or more of these hot pads directly with an ordinary apron, where the pads are constantly available, this danger of injury may be substantially eliminated, and that this may also be done without undesirably marring or impairing the appearance of the aprons.

It is therefore a more specific object of my present invention to provide an improved apron having one or more hot pads suspended therefrom in such a manner that the pads while being constantly available, are substantially concealed when not in actual use.

Another object of this invention is to provide an improved apron and hot pad assemblage in which one or more of the pads are readily detachably suspended from the apron without undesirably distorting or pulling the apron out of shape.

A further object of the invention is to provide an improved combined household apron and hot implement holder, wherein two hot pads, one for each of the apron wearer's hands, are made readily available at all times, in order to facilitate carrying of hot dishes, bowls or the like.

Still another object of my invention is to provide an improved hot pad and apron assemblage which is attractive and neat in appearance, and which may also be made and sold at moderate cost.

These and other specific objects and advantages of the invention will be apparent from the following detailed description.

A clear conception of a typical embodiment of my invention, and of the mode of constructing and of utilizing combined aprons and hot pads made in accordance with my improvement, may be had by referring to the drawing accompanying and forming a part of this specification wherein like reference characters designate the same or similar parts in the various views.

Fig. 1 is in a rear view of one of the improved combined aprons and hot pads, showing the apron in flat condition and two hot pads freely suspended from the rear medial portion of the apron;

Fig. 2 is a front view of the same apron disposed in flat condition, showing one of the suspended hot pads in concealed position and the other swung laterally of the apron; and Fig. 3 is an enlarged fragmentary view showing the detachable connection between one of the hot pad suspension straps and the rear portion of the apron.

While the invention has been shown and described herein as involving the detachable association of two hot pads with an apron of the shoulder strap suspended type, it is not my desire or intention to thereby unnecessarily limit or restrict the scope and utility of the improvement which is adapted for more general application to other types of aprons.

Referring specifically to the typical embodiment of my invention shown in the drawing, the apron 5 comprises a lower or lap portion 6 having an upper or chest protecting portion 7 of lesser width, formed integral with the lap portion 6, and a pair of crossed suspension or shoulder straps 8 connecting the outermost upper corners of the lap portion with the opposite outermost upper corners of the chest portion 7. The apron portions 6, 7 and the shoulder straps 8 may be formed of suitable fabric, and the lower outermost ends of the straps 8 are reenforced by means of partial waist bands 9 secured to the upper end of the lap portion 6; and the shoulder straps 8 may be made adjustable in length so as to fit individuals of different heft and stature. This type of shoulder strap apron 5 is not new, but is especially adapted for use in conjunction with the present improvement.

In accordance with my invention, I provide a pair of ordinary square or otherwise shaped flat hot pads 10 with relatively long suspension straps 11, and the upper ends of these straps 11 are secured to the rear of the apron 5 on opposite sides of the lap portion 6. The hot pads 10 and straps 11 may be covered or made of the same fabric as that used in constructing the apron proper, and the straps 11 are preferably detachably attached to the apron 5 adjacent to the reenforcing bands 9 with the aid of snap fasteners or hooks 12 and eyes 13 as shown in detail in Fig. 3. These detachable fasteners are preferably located inwardly of the outer ends of the waist bands 9 a sufficient distance so that when the straps 11 are vertically disposed, the dangling hot pads 10 will be substantially concealed beneath the lower apron portion 6 as shown in the drawing, but the pads 11 should be located above the bottom edge of the apron 5 and should be within free and easy reach of the apron wearer at all times.

When the combined apron and hot pad assemblage has been properly constructed and united as above described, the apron 5 may be applied to a body and worn in the usual manner, with the shoulder straps 8 coacting with the wearer's shoulders and crossing at the wearer's back so as to pull the lower lap portion 6 about the wearer's lap and thus normally substantially conceal the freely suspended dangling hot pads 10. If so desired, the lower end of the lap portion 6 may be widened somewhat so as to insure more complete concealment of the hanging pads 10, but it has been found that slight exposure of the outer corners of the pads 10 is not objectionable and in fact makes the pads more readily accessible. Whenever the apron wearer requires the use of one or both of the hot pads 10, it is only necessary to reach down at arms length on either or both sides, and to grasp the required pad or pads 10; and by providing these hot pads on both sides of the apron 5, both hands may be most effectively protected as when carrying hot dishes, bowls or pans which are not provided with carrying handles. After the pads 10 have been thus utilized, they may be returned by gravity and concealed behind the lower apron portion 6 by merely dropping them, thus making the pads freely accessible at all times and unobstructive when not in use.

From the foregoing detailed description it will be apparent that my present invention provides an improved combined apron and hot pad assemblage which is extremely simple and compact in construction and which is moreover highly effective in use. By providing a pair of hot pads 10 for each apron 5, both hands of the wearer may be amply protected against possible burns, and by suspending the hot pads 10 with the aid of detachable straps 11, these hot pads may be readily removed and separately cleaned or attached to another apron. The suspension of the hot pads 10 by means of elongated straps 11 also permits free movement of the pads after they have been grasped, while at the same time effectively concealing the pads 10 beneath the lower apron portion 6 when the pads are not in use. It is also to be noted that the suspension of the pads 10 from the apron assemblage at the waist reenforcing strips 9, prevents the pads from pulling the apron out of shape and causes the weight of the pads 10 to be borne by the shoulder straps 8. The entire combined assemblage may obviously be readily manufactured at moderate cost, of any suitable fabric or other material, and the improved apron has proven highly practical in actual use and presents an extremely neat and aesthetic appearance. The apron 5 may also be provided with the usual pockets and decorations in order to enhance its utility and beauty to a maximum, and as previously indicated, the shoulder straps 8 may be made adjustable so as to suit different conditions.

It should be understood that it is not desired to limit this invention to the exact details of construction or to the precise mode of use, herein shown and described, for various modifications within the scope of the appended claims may occur to persons skilled in the art.

I claim:

1. In an apron assemblage, an apron having a reenforced waist band, a pair of flexible straps suspended from the opposite ends of said band rearwardly of the apron, and a pad suspended from the free end of each strap, said pads when not in use together with their suspension straps being concealed beneath the apron.

2. In an apron assemblage, an apron having a reenforced waist band and supporting shoulder straps connected to the opposite ends of said band, a flexible strap suspended from each of said band ends rearwardly of the apron, and a pad suspended from the free end of each strap, said pads when not in use together with their suspension straps being concealed beneath the apron.

FRANCES DORCEY.